May 12, 1931.   F. G. CREED ET AL   1,804,496
TELEGRAPHIC TRANSMITTING AND TAPE PERFORATING APPARATUS
Original Filed Aug. 16, 1926   5 Sheets-Sheet 3
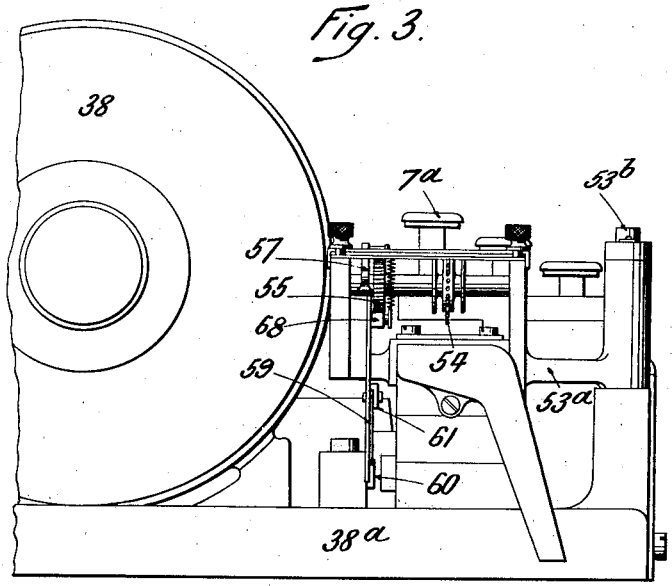
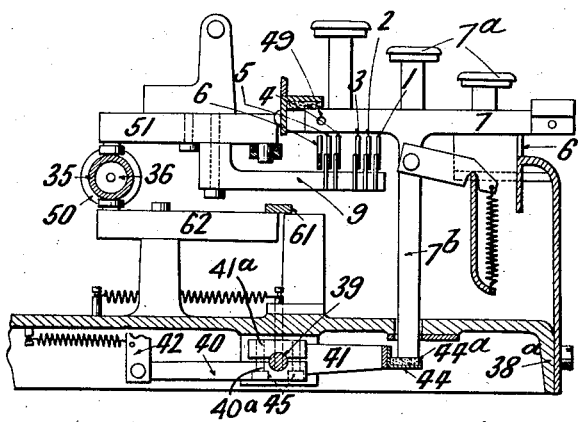

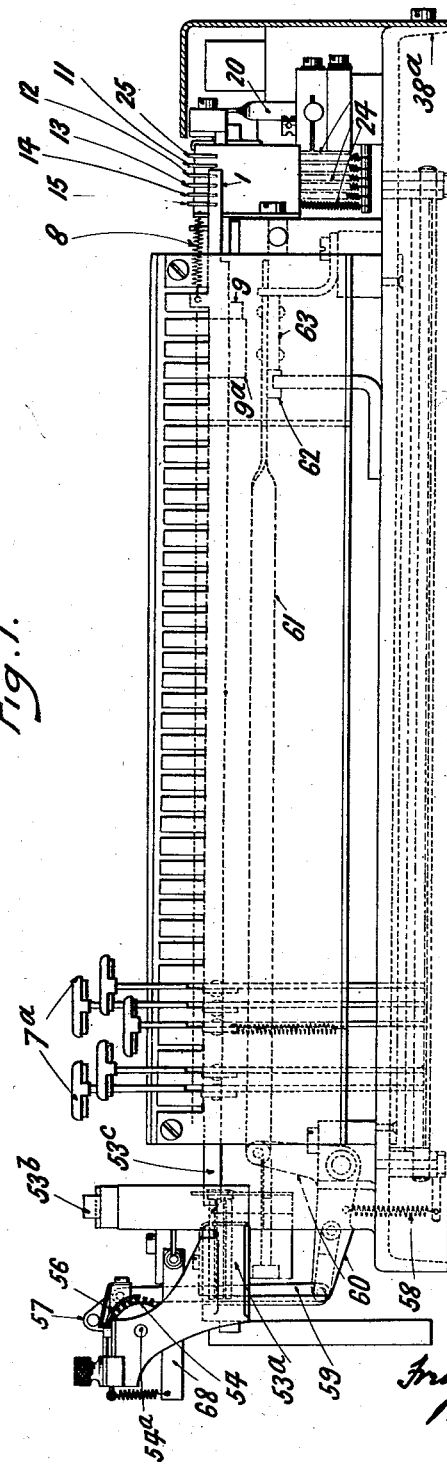

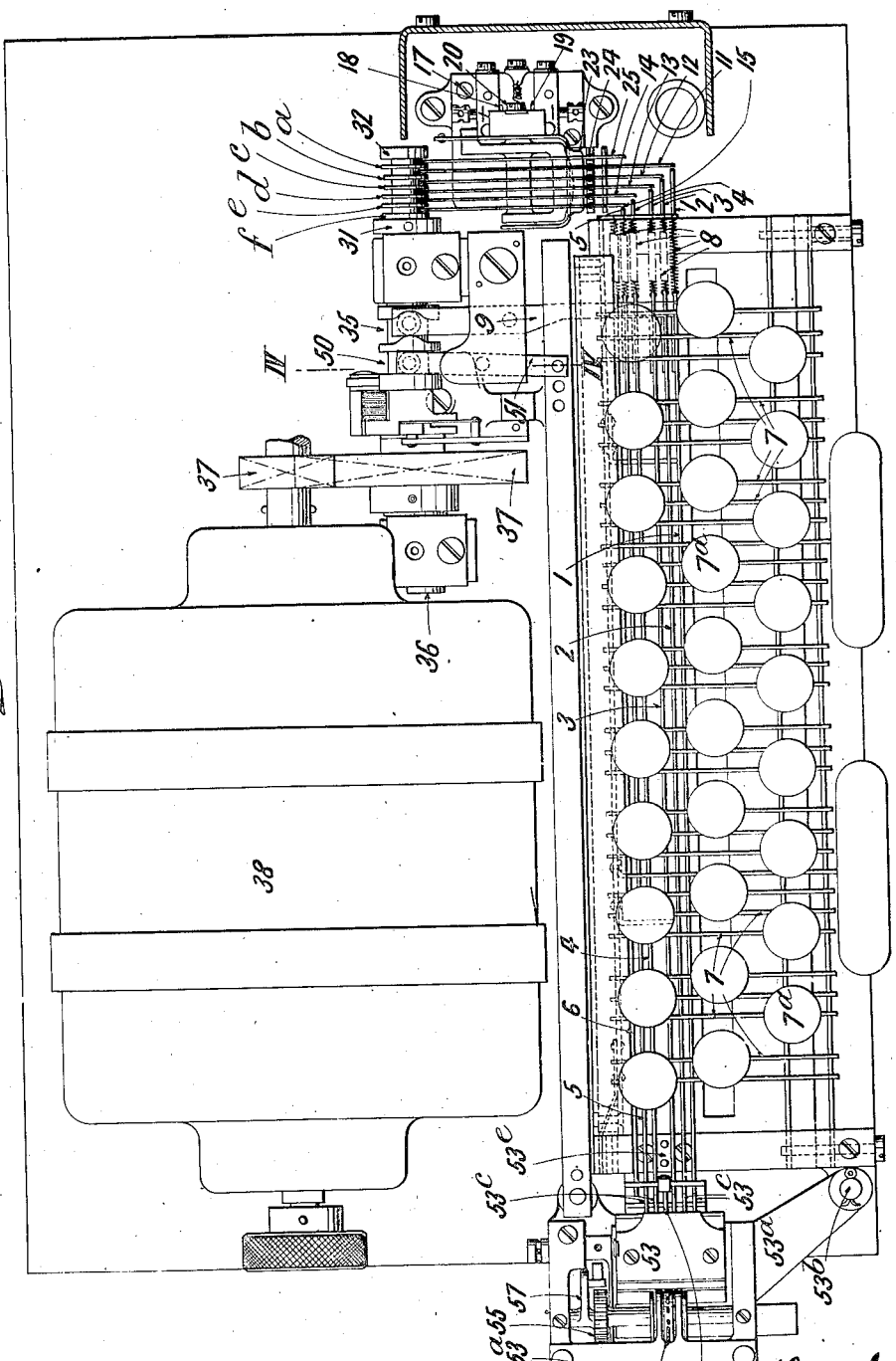

May 12, 1931.  F. G. CREED ET AL  1,804,496
TELEGRAPHIC TRANSMITTING AND TAPE PERFORATING APPARATUS
Original Filed Aug. 16, 1926  5 Sheets-Sheet 4
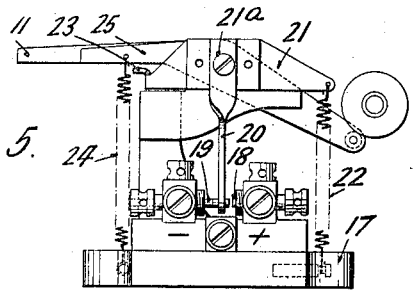
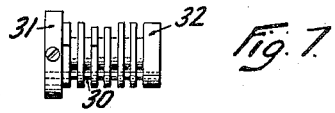
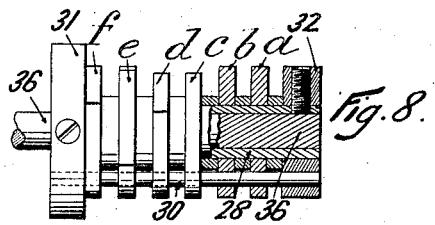
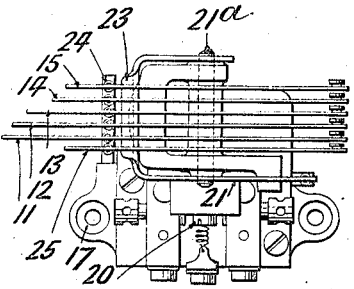
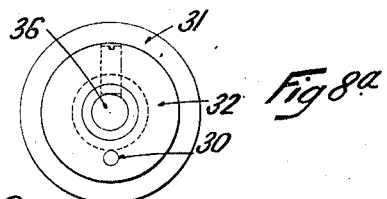
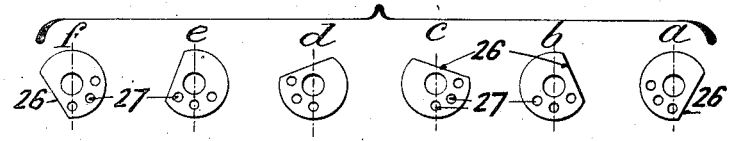
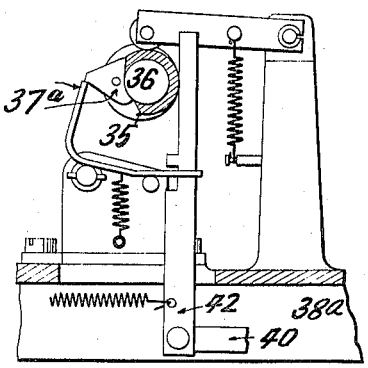

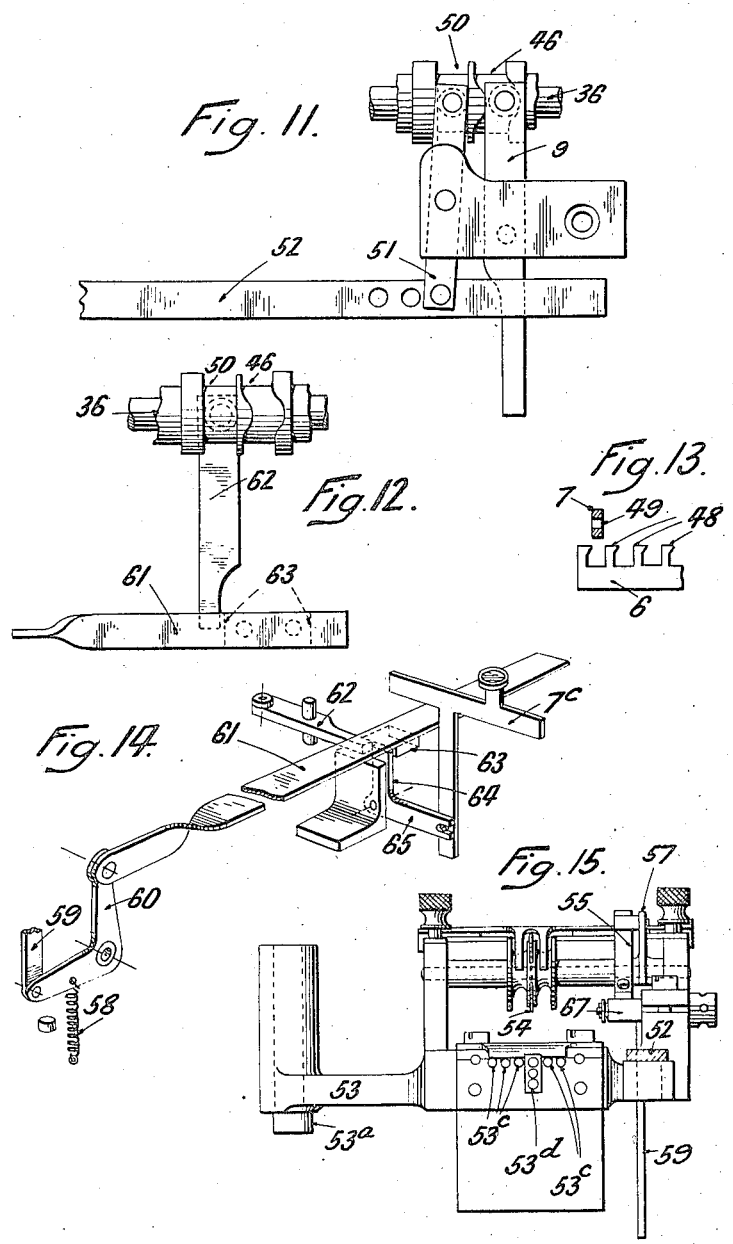

Patented May 12, 1931

1,804,496

UNITED STATES PATENT OFFICE

FREDERICK GEORGE CREED AND REGINALD DENNIS SALMON, OF CROYDON, ENGLAND, ASSIGNORS, BY MESNE ASSIGNMENTS, TO CREED & COMPANY LIMITED, OF CROYDON, ENGLAND, A COMPANY OF GREAT BRITAIN

TELEGRAPHIC TRANSMITTING AND TAPE PERFORATING APPARATUS

Application filed August 16, 1926, Serial No. 129,441, and in Great Britain October 22, 1925. Renewed March 19, 1931.

This invention relates to telegraphic apparatus and more particularly to telegraphic key boards of the kind in which combination bars are moved in particular combinations by the depression of key levers.

The general object of the present invention is to effect certain improvements in this type of apparatus whereby great simplification results and the range of usefulness of the apparatus is increased. Thus a keyboard in accordance with the present invention can be used to transmit electric signals directly, with the aid of a line wire to combined receiving and printing apparatus located at a distance, or it can be used to perforate tape to be subsequently used in another form of transmitter. In yet other cases the keyboard may be adapted for both of the purposes aforesaid.

In the specification of Letters Patent No. 1,639,212, notched combination bars are individually associated with companion switch members adapted selectively to render stationary contacts of a rotary current distributor, positive or negative as required, from which it will be obvious that a large number of current carrying contacts are involved. A feature of the present invention therefore consists in reducing the number of such contacts to which end a switch member movable into and out of engagement with but a single pair of contacts, replaces the multiple switches and distributor aforesaid, such switch member being controlled as to position, successively in respect of each signal unit.

The switch movements may be due, after key depression, to the motor operation of a series of cams acting in cyclic order upon members the movement of which may be transmitted, or not transmitted, to the switch member, in accordance with the positions occupied by the individual combination bars.

If the signal currents are not to be transmitted at once but are to be recorded as perforations in a tape for use subsequently in a separate transmitter, which may be of the type forming the subject of our co-pending application No. 129,440, filed Aug. 16, 1926, the combination bars of the key board are not spaced apart at equal distance but are spaced in groups so that the signal perforations occur at opposite sides of the central row of feed perforations required in the tape, one end of a combination bar serving as an abutment for a corresponding tape punch, the block for carrying all the punches being adapted to be advanced towards and removed from the combination bars. The employment of combination bars separated in groups, as referred to, thus enables a single keyboard to be built which can be used for either of the two purposes above mentioned, or for both purposes at will.

The accompanying drawings illustrate one embodiment of the invention, Fig. 1 being a front elevation of so much of a combined signal transmitter and tape perforator as is necessary to an understanding of the improvements. Fig. 2 is a corresponding plan and Fig. 3 an end elevation. Fig. 4 is a sectional end elevation corresponding to the line IV—IV of Fig. 2. Fig. 5 is an end elevation looking towards Fig. 1 from the right, of a part of the apparatus removed from the remainder and Fig. 6 is a corresponding plan view. Fig. 7 is an elevation of the cam assemblages of the apparatus referred to. Fig. 8 shows said cam assemblage to a larger scale and partly in axial section. Fig. 8a is an elevation at right angles thereto. Fig. 9 represents the set of cams prior to assembly. Fig. 10 is a sectional elevation of a part of the apparatus. Figs. 11 and 12 are plan views of other parts of the apparatus. Fig. 13 is a sectional view of parts of Fig. 4, the section being at right angles thereto. Fig. 14 is a perspective view of means for altering the feed of tape to be perforated. Fig. 15 is an elevation of part of the tape punching mechanism shown at the left hand side of Fig. 1 alone and as viewed from the right.

For the carrying out of the invention, as applied to a system using start and stop signals and five combination signals, which is the one chosen for illustration, a set of six longitudinally movable bars 1, 2, 3, 4, 5 and 6 may be employed, five of which, namely numbers 1 to 5 inclusive, as in the earlier specification referred to, are notched combination bars, whilst the sixth bar, numbered 6, is employed to positively hold any one of the key bars 7 when depressed by a key 7ª against return movement until the stop signal is being effected. The combination bars 1—5 differ in length as shown in Fig. 2 and are so arranged that whereas normally when moved to the left against the action of their springs 8 by the motor operated retracting bar 9 acting against a lug 9ª on each of them, each combination bar at one end, in the example shown the left hand end, terminates in a common plane, whilst their opposite ends extend seriatim almost to within reach of the planes of movement of a corresponding number of levers 11, 12, 13, 14 and 15 respectively arranged perpendicular to the said combination bars. These levers 11—15 also differ in length (see Figs. 2 and 6) and terminate so that any one of the combination bars 1—5 moved into the path of the corresponding lever, cannot interfere with the movement of any other lever, the bar movement being effected in a manner equivalent to that already known, as by means of the springs 8 which urge the bars to the right when released. Mounted upon a suitable part of the frame of the keyboard is a transmitter unit comprising a support 17 (Figs. 2, 5 and 6) for a pair of contacts 18 and 19 connected respectively to a positive pole and a negative pole of a source of current as indicated by the signs + ad—. Between the contacts 18 and 19 is arranged a movable switch arm 20 conveniently in the form of a spring blade, carrying a double contact adapted to engage the positive and negative contacts 18 and 19 alternately. The movable switch arm 20, which is connected to the telegraph line, is carried by an insulated rocking member 21 pivoted at 21ª and normally held by a spring 22 so that the negative contact 19 is engaged by the switch arm 20 this being the condition corresponding to the stop signal. A yoke 23 extends laterally from the rocking member 21 so that it extends under and therefore across the paths of the levers 11—15 constituting the motion-transmitting members hereinbefore referred to. The arrangement is such that if no additional obstruction is placed in the paths of the levers 11—15 by the combination bars 1—5, successive release of the levers 11—15 by cams, as will hereinafter appear, will permit the said levers to move, under the action of separate springs 24, and each to displace the yoke 23 and member 21 and move the switch arm 20 into engagement with the contact 18 of opposite polarity. If at the instant of release of any one of the levers 11—15, a combination bar 1—5 is in position to obstruct its downward movement, the yoke 23 will not be rocked, and the switch arm 20 is permitted to remain in engagement with or to return to the negative contact 19. Since the stopping signal is always opposite in polarity to the starting signal, the yoke 23 is adapted to be first moved by a lever 25 additional to those numbered 11—15 associated with the combination bars 1—5 but not affected by any of these bars and hence, in this instance, always unobstructed.

The successive liberation of the levers 11—15, so that they can move, except when obstructed by a combination bar, and also the liberation of the lever 25, may be effected by a set of discs each having a flat surface thereon and constituting an edge cam. In the particular example shown, six such cam members $a, b, c, d, e, f$, (Figs. 2, 5, 6, 7 and 8) are required, and a subsidiary feature of the invention consists in a simple mode of constituting a multiple cam unit suitable for this purpose. To this end, six identical discs are employed as shown in Fig. 9, each having in addition to a flat surface 26 thereon, three circularly arranged holes 27. These discs can be assembled upon a sleeve 28 (Fig. 8) together with spacing washers 29, in six different angular positions with the aid of a single positioning pin or rod adapted to be received by one of the holes 27 of each disc, three positions being obtainable by threading three of the discs, viz $a, b, c$, on the pin or rod 30 with one face foremost, using different holes, and three further positions by reversing the remaining disc $d, e, f$, and then threading them on as in the case of the first three. The pin or rod 30 may be firmly fixed in a ring carrier or collar 31 of the sleeve 28, the cam discs and washers 29 being secured upon the sleeve by an outer ring or washer 32 fixed thereto as by a pin 33, or otherwise.

The sleeve 28 of the multiple cam unit thus built up is secured to one end of a sleeve 35 mounted upon and adapted to be connected periodically to a shaft 36 (Figs. 2, 10, 11 and 12) continuously driven through gearing 37 from an electric motor 38 so that the sleeve 35 will make one complete revolution and then stop in a manner now well known. The means for thus intermittently rotating the sleeve 35 through one revolution at a time may be a form of the ratchet and pawl clutch and releasing means described for example in our said earlier specification Serial No. 745,934 Patent No. 1,639,212, and herein designated 37ª (see Fig. 10). The parts however are preferably so arranged, as shown in Fig. 4, that the height of the keyboard can be reduced, the top plate of the hollow base 38ª of the frame being say above the pivot 39 of the lever 40—41 employed to put the clutch (Fig. 10) in action by the aid of the upwardly extending rod 42 which is raised each time a key bar 7 is depressed each key bar acting through a depending bar 7ᵇ upon a plate 44 (Fig. 4) carried by the right hand arm 41 of the lever 40—41 and common to all the depending bars 7ᵇ. The plate 44 may carry a strip 44ᵃ of cushioning material to ensure quiet working. Each bar extends, as shown, through the top plate of the base 38ᵃ. The lever 40—41 which may, as shown, have its arms substantially aligned, has a form of split bush connection 40ᵃ 41ᵃ to its pivot 39 to enable adjustment to be readily effected as by screws 45, the parts being easily accessible for this purpose.

The sleeve 35 connected to the sleeve 28 upon which the multiple cam unit is secured, is formed with a cam groove 46 (Figs. 2, 11 and 12) to actuate the retracting bar 9 associated with the combination bars 1—5, and with the longitudinally movable bar 6 employed positively to lock the key bar 7 that happens to be depressed. This locking may be effected by forming the said bar 6, as shown in Figs. 4 and 13, with right angled gaps leaving teeth 48 any one of which, corresponding to a key bar 7 that has been depressed, is caused to enter a hole 49 in the latter. The other teeth 48 at this time come under the other key bars 7 and prevent them being depressed, until the cycle of operation is finished.

Since the keyboard is intended to be applicable for use in perforating tape, if so desired, the sleeve 35 is formed with another cam 50 (Figs. 11 and 12) adapted to operate the punch block of tape perforating mechanism situated at the left hand end (Figs. 1 and 2) of the transmitter. This may be done through a lever 51 (Figs. 2 and 11) operated by the said cam groove 50, and a longitudinally movable link 52, the punch block 53 being secured to a carrier 53ᵃ that is mounted upon a vertical pivot 53ᵇ arranged at some distance to one side of the block. The punch block is arranged substantially in the plane containing the ends of the combination bars 1—5, one or more of which, according to the key bar 7 depressed, serves or serve as an abutment or abutments for the punch or punches 53ᶜ, of which there are five. The punch block is also provided with three superposed punches 53ᵈ that are prevented from moving endways by a stationary abutment 53ᵉ and serve for punching a central row of feed holes in the tape to be perforated to form signals. The punch block punches 53ᶜ may substantially be of the same type and act in the same manner as those described in the specification of Letters Patent No. 1,579,087. The tape to be punched is fed upwards intermittently by a feed wheel 54 (Figs. 1, 2 and 15) stepped round by means of a ratchet wheel 55 fixed to the feed wheel spindle 54ᵃ and a pawl 56. The pawl 56 is carried by a rocking member 57 journalled on the spindle 54ᵃ and adapted to be moved positively in one direction to effect feeding of the tape, against the action of a spring 58 (Fig. 1), by a link 59, bell crank lever 60 and bar 61 which, for this purpose is moved to the right by a lever 62 arranged to be oscillated by the cam groove 50 (Fig. 12) used to reciprocate the punch block 53, the said lever 62 acting against a lug 63 (Figs. 12 and 14) on the said bar 61. The return movement of the link 59, feed lever 60 and bar 61 is effected by the spring 58 when the free arm of the lever 62 is moved to the left (Figs. 2 and 12). Ordinarily, the tape will be fed endways at each feeding operation, through a space equal to the pitch of the central row of feed holes punched in the tape. To enable the tape to be fed through a greater distance, say one equal to three times the pitch of the feed holes, as for instance when it is desired to use the perforated tape in a page printing machine and it is required to punch in the tape, perforations representing a carriage return signal followed by a blank portion of tape equal in length to three times the pitch of the feed holes, the extent of the return movement of the feed lever 60, under the action of its spring 58, may be controlled normally by one arm 64 of a lever the other arm 65 of which is connected to the depending bar 7ᵇ of a carriage return key bar 7ᶜ (Fig. 14). In this case, the arrangement is such that ordinarily the arm 64 of the lever 64—65 will arrest the lug 63 and bar 61 when they are released by the lever 62 moving to the left after permitting the pawl 55 to be returned by the lever 60, under the action of the spring 58, through a distance equal to the pitch of the feed holes in the tape. When however the carriage return key bar 7ᶜ is depressed, the arm 64 of the lever 64—65 will be moved out of the path of the lug 63 which, with the bar 61, will be moved, by the action of the spring 58, to a distance such as to enable the feed lever 60 to move the pawl 55 backward to a distance such that when the pawl is again operated by the action of the lever 62 on the lug 63, the tape will move endways through a distance equal say to three times the pitch of the feed holes in the tape for the purpose mentioned.

The teeth of the ratchet wheel 56 may be so formed that they can be engaged by a roller upon a spring loaded arm 68 (see Figs. 1 and 3) and in this way serve to index the position of the wheel.

As will be obvious, details of construction can be variously modified. Thus, in lieu of the locking bar 6 (Figs. 2, 4, and 13), which is one feature of the invention, each of the combination bars 1—5, with which it has been described as associated, may be formed so as to act in a similar manner to the locking bar which can then be dispensed with. In other words the teeth of each combination bar 1—5 might be formed so as to hold down, in a positive manner, the key bar 7 which, when depressed, acts to lock the combination bar endways. In this case, the locked combination bar will be enabled to move endways to a small extent to enable a tooth thereon to engage the depressed key bar.

What we claim is:—

1. A telegraphic keyboard, comprising a single electric signalling switch, a tape perforating punch arrangement and a single series of longitudinally movable combination bars mechanically associated with both the switch and punch arrangement aforesaid, whereby electric signal combinations can be transmitted simultaneously with the mechanical production of a record of such signal combinations, or whereby either signal combinations alone, or punched tape alone, can be respectively transmitted or mechanically produced.

2. A telegraphic keyboard, comprising in combination an electric signalling switch, a plurality of switch operating levers, means tending to move all said levers in one direction, means for permitting such levers to move in cyclic order, and longitudinally movable combination bars adapted to directly prevent the movement of any required lever or levers to suit the signal combination to be transmitted.

3. A telegraphic keyboard, comprising a switch member, a series of levers each adapted to impart movement to the switch member, motive means urging the levers to move in one direction, a series of cams normally restraining movement of all of the operating members but acting in cyclic order to remove said restraint to movement, a series of longitudinally movable combination bars adapted to be brought into the paths of the associated levers aforesaid to arrest the same and key means controlling the movement of the combination bars.

4. A keyboard according to claim 3 in which the longitudinally movable combination bars are of different lengths, and the switch moving levers are also of different lengths arranged perpendicular thereto.

5. A telegraphic keyboard, comprising in combination a switch member, a series of levers each adapted to move such switch member, spring means adapted to impart movement to the various levers, cam means adapted to release the levers in cyclic order to allow them to be moved and combination bars adapted to be moved longitudinally to positively obstruct any such lever that it may be desired should not move when released by its cam.

6. In a keyboard, adapted to punch tape, the combination with a plurality of combination bars each terminating at one end in a common plane and serving collectively as punch abutments, of a punch block and a vertical pivot arranged substantially in the plane aforesaid about which the block is movable.

7. In a keyboard, a movable switch arm, a pair of stationary contacts, a spring urging the arm towards one such contact, a plurality of levers each adapted to be independently moved, a rocking device common to all said levers whereby movement of any single lever is transmitted to the switch arm spring means adapted to move all the levers, cam means adapted to liberate said levers in cyclic order to permit them to respond to the movement imparting spring means and longitudinally movable combination bars adapted to positively obstruct such levers as are not to respond to movement when liberated, in accordance with signals being transmitted, one lever being always unobstructed and adapted to transmit a starting signal.

8. In a keyboard, a series of key levers, a single longitudinally movable bar arranged at right angles to the said key levers and means whereby the bar is moved upon depression of any key lever, said bar being adapted to hold in a positive manner such depressed key lever, until the stop signal is being effected.

9. A keyboard according to claim 6 wherein the cam means consists of a multiple cam unit comprising a plurality of identical discs each having a peripheral flat surface and, in addition, a set of circularly arranged holes parallel to the axis, a support therefor and a single positioning member unmovable in relation to the support, adapted to be received by one hole of each disc aforesaid, some of the discs being arranged on the support and positioning member with one face foremost, using different holes in the discs, and the number of positions thus obtainable being augmented by arranging the remaining discs in the reverse order on the support and positioning member.

10. In a keyboard, a punch block, a tape feed wheel carried thereby, a multiple punch combination adapted to punch a row of holes in, and lengthwise of, the tape, means for rotating said feed wheel, said means embodying a link adapted to be reciprocated, a motor, means actuated by the motor for moving the feed link, always to one definite feed starting position, operable stop means adapted to permit the feed lever to move in the feed direction to an extent corresponding to several times the pitch of the feed holes, means adapted to restrain the stop means from enabling a feed movement to be effected, at each ordinary signal transmission, greater than the pitch of the feed holes and a key adapted to operate the stop restraining means when the increased feed is required.

11. In telegraphic apparatus, selecting members, selectable members adapted to be moved in different combinations according to the actuation of different selecting members, a switch member, means for positioning said switch member in succession in accordance with the movement of the different selectable members, and means for causing said selectable members to perforate a tape.

12. In telegraphic apparatus, selecting members, selectable members adapted to be moved in different combinations according to the actuation of different selecting members, a switch member, means for positioning said switch member in succession in accordance with the movement of the different selectable members, a punch block, punches, and means for moving said punch block and punches against said selectable members acting as abutments for said punches to perforate a tape.

13. A telegraphic keyboard comprising key levers, combination bars adapted to be selected in combinations representing signals by the actuation of the said key levers, a switch member, cam means for determining the position of the said switch member successively in accordance with the position of successive combination bars, and motor operated means for operating said cam means for releasing for operation the selected combination bars and for returning operated combination bars to normal position.

14. A telegraphic keyboard comprising key levers, substantially straight combination bars terminating at one end in the same plane and at their opposite ends in different planes and switch operating levers extending at right angles to said combination bars and controlled thereby.

15. A telegraphic keyboard comprising combination bars, means for moving said combination bars longitudinally, means movable towards one end of said bars for perforating a tape and means at the other end of said bars for actuating a switch member.

16. A telegraphic keyboard comprising key levers, substantially straight combination bars terminating at one end in the same plane and at their opposite ends in different planes, means for moving the said combination bars in one direction in combinations representing signals, a punch block and punches at the first end of said bars, means for moving the said punch block and punches against said combination bars to perforate a tape, and at the second ends of said combination bars for transmitting electrical signals.

17. A telegraphic keyboard comprising combination bars and a switch member and a tape perforator associated therewith, the said bars at one extremity being arranged to operate the switch member, and at the other extremity to act as an abutment for the tape perforator.

18. A telegraphic keyboard comprising key levers, substantially straight combination bars terminating at one end in the same plane, and at their opposite ends in different planes, switch operating levers extending at right angles to said combination bars and terminating in different planes by which said bars can control the movement of said levers.

19. A telegraphic keyboard comprising key levers, substantially straight combination bars terminating at one end in the same plane, and at their opposite ends in different planes, and a pivoted tape perforating mechanism located adjacent the first-mentioned ends of said bars, and adapted to co-act therewith to perforate the tape.

20. A telegraphic keyboard comprising combination bars, and means for moving said bars longitudinally, the opposite extremities of said bars acting as punch abutments in the perforation of a tape and switch operating lever controls respectively.

21. A telegraphic keyboard comprising key levers, combination bars adapted to be selected in combinations representing signals by the actuation of said key levers, a switch member, switch operating levers extending at right angles to said combination bars and controlled thereby, cam means paralleling said bars for determining the position of said switch member successively in accordance with the position of successive combination bars, and means for operating said cam means.

22. A telegraphic keyboard comprising combination bars, means for moving said bars longitudinally, a switch member located at one end of said bars, a plurality of levers for controlling the movements of said switch under the control of the adjacent ends of said bars, a plurality of cams for operating said levers in succession, a pivoted tape perforator adjacent the other end of said bars, and means for reciprocating said tape perforator towards and from said bars.

23. A telegraphic keyboard comprising a switch member, a rocking member carrying said switch member, a series of levers each adapted to move such switch member through said rocking member, spring means adapted to impart movement to the various levers, cam means adapted to release the levers in cyclic order to allow them to be moved and combination bars adapted to be moved longitudinally to positively obstruct any such lever that it may be desired should not move when released by its cam.

24. A telegraphic keyboard comprising an electric signalling switch, a rocking member carrying said switch member, a plurality of levers for operating said rocking member, means tending to move all said levers in one direction, means for permitting such levers to move in cyclic order, and longitudinally movable combination bars adapted to prevent the movement of any required lever or levers to suit the signal combination to be transmitted.

25. A telegraphic keyboard comprising a switch member, a rocking member carrying said switch member, a series of levers each adapted to impart movement to said rocking member to operate the switch member, motive means urging the levers to move in one direction, a series of cams normally restraining movement of all the operating members but acting in cyclic order to remove said restraint to movement, a series of longitudinally movable combination bars adapted to be brought into the paths of the associated levers aforesaid to arrest the same and key means controlling the movement of the combination bars.

26. In telegraphic apparatus, selecting members, selectable members adapted to be moved in different combinations according to the actuation of different selecting members, a switch member, means for positioning said switch member in succession in accordance with the movement of the different selectable members, and means for causing said selectable members to act as punch abutments in the perforation of a tape.

27. A telegraphic keyboard comprising combination bars, means for moving said bars longitudinally, a reciprocating tape perforator located adjacent one end of said bars, switch operating levers adjacent the opposite end of said bars and controlled thereby, a driven shaft, and means carried thereby for reciprocating said tape perforator, for operating said switch levers, and for returning said bars to normal position after longitudinal movement thereof.

Signed at Croydon in the county of Surrey, England, this twenty-sixth day of July, 1926.

FREDERICK GEORGE CREED.
REGINALD DENNIS SALMON.